United States Patent [19]

Booker, Jr.

[11] Patent Number: 4,508,028
[45] Date of Patent: Apr. 2, 1985

[54] COOKING APPARATUS FOR VERTICALLY SUSPENDING AND ROTATING MEAT

[76] Inventor: James D. Booker, Jr., P.O. Box 355, Marksville, La. 71351

[21] Appl. No.: 551,328

[22] Filed: Nov. 14, 1983

[51] Int. Cl.³ .............................................. A47J 37/04
[52] U.S. Cl. .................................... 99/421 V; 126/30
[58] Field of Search ................. 99/419, 421 R, 421 V; 211/1.5; 248/121; 126/25 R, 25 AA, 29, 30

[56] References Cited

U.S. PATENT DOCUMENTS

| | | |
|---|---|---|
| 1,612,252 | 12/1926 | Beverly . |
| 1,728,738 | 9/1929 | Rasmussen et al. . |
| 2,477,183 | 7/1949 | Humensky ........................ 126/30 X |
| 2,517,360 | 8/1950 | Singer .................................... 99/443 |
| 2,608,149 | 8/1952 | Ellis .............................. 126/25 A X |
| 2,722,882 | 11/1955 | Wilson .................................. 99/421 |
| 2,900,897 | 8/1959 | Fisher .................................... 99/340 |
| 4,043,260 | 8/1977 | LaPour ................................ 99/421 |

FOREIGN PATENT DOCUMENTS

| | | | |
|---|---|---|---|
| 1069985 | 7/1954 | France | ............................. 99/421 V |
| 316124 | 11/1956 | Switzerland . | |

*Primary Examiner*—Billy J. Wilhite
*Attorney, Agent, or Firm*—David L. Ray

[57] ABSTRACT

A portable apparatus for suspending an object to be cooked in close proximity to a heat source while rotating the object about a vertical axis. The hook upon which the meat or objects to be cooked or hung is rotated by a chain connecting a sprocket on the hook with a sprocket on an electric motor. The chain is sufficiently long so that the motor may be placed far enough from the fire or heat source to prevent damage to the motor. Preferably, the hook and motor is contained within a single frame which has two hooks at the top thereof so that the frame may be suspended from a horizontal pipe.

15 Claims, 3 Drawing Figures

COOKING APPARATUS FOR VERTICALLY SUSPENDING AND ROTATING MEAT

BACKGROUND OF THE INVENTION

1. Field of the Invention

The present invention relates to a apparatus for cooking meat or other items. In particular, the invention relates to a device for suspending an object to be cooked over an open fire and rotating the object while it is being cooked.

2. Description of the Prior Art

In the southern part of Louisiana it is customary among the Acadian people who inhabit this region to hold festivals which they refer to as a "Cochon du Lait". At these festivals a whole pig is roasted slowly over an open fire. Tradition requires that the pig be suspended vertically above the fire. The roasting of the pig may take as long as 24 hours or more depending upon the size of the pig and the intensity of the fire. During this period of time it is necessary that an attendant turn the pig periodically to prevent the meat from being burned and to promote uniform cooking.

The pig or other animal is rotated manually by the attendant or cook throughout the cooking period. The more often the pig is rotated the more uniformly the pig will cook. Ideally the pig is rotated continuously at a constant rate. However, since the pig is suspended directly above the fire, any motors or turning devices connected to the hook upon which the pig is impaled is subjected to very high temperatures from the cooking fire. Thus any electric motor or wiring connected closely to the meat hook will be destroyed by the heat radiating from the fire.

Many devices for rotating an object being cooked are known in the art. Exemplary of these devices are the following:

U.S. Pat. No. 4,043,260 discloses an apparatus for supporting a rotisserie over an outdoor open fire. The rotisserie is hung from a frame by a chain and holds the object to be cooked in a horizontal position over the fire so that the object being cooked rotates about a horizontal axis. An electric motor is connected to the rotisserie at a distance away from the fire.

U.S. Pat. No. 2,900,897 discloses a portable barbeque apparatus having a fire pan and grid frame with wheels connected to the frame for easy portability. The stand has a handle for directing the stand while transporting, and an electric motor which drives a horizontal rotisserie through a chain and sprocket transmission.

U.S. Pat. No. 2,722,882 discloses a barbeque oven in which is located a rotisserie which can receive a series of spits for holding varies pieces of meat on two vertical rotating plates attached to the rotisserie. The various pieces of meat travel in a circular path about a horizontal, transverse axis within the oven. The rotisserie is driven by an electric motor connected to a "V" belt and a pulley connected to the rotisserie.

U.S. Pat. No. 2,517,360 discloses a broiling device wherein meat is hung vertically to hooks arranged on horizontal discs which rotate about the central axes. A vertical, central heating element cooks the meat as the meat rotates about the central element suspended from the hooks.

U.S. Pat. No. 1,728,738 discloses a barbeque machine guarding device including a curtain which can be interposed between the fire and the meat being cooked. The meat being cooked is suspended vertically in front of an open fire place on a series of hooks which are rotated through a shaft and gear drive connected to a electric motor.

U.S. Pat. No. 1,612,252 discloses a barbeque device including an oven in which meats are vertically suspended or impaled. The meat suspending and impaling devices are driven by an electric motor mounted in the bottom of the oven beneath the heating elements. The heating elements are arranged vertically inside the oven.

Swiss Pat. No. 316,124 discloses a horizontal rotisserie which can be inclined at an acute angle with the ground which is driven by an electric motor powered by a battery. The angle of the spit relative to the horizontal can be varied by lowering the end of the spit along one of two rods which supports the spit.

It can thus be seen that there is a need for a cooking apparatus which can suspend meat vertically over an open fire and rotate the meat continuously while the meat is being cooked which will not be damaged by the fire over which the meat is being roasted.

SUMMARY OF THE INVENTION

In accordance with the present invention there is provided a portable apparatus for suspending an object to be cooked in close proximity to a heat source while rotating the object about a vertical axis. The hook upon which the meat or objects to be cooked or hung is rotated by a chain connecting a sprocket on the hook with a sprocket on an electric motor. The chain is sufficiently long so that the motor may be placed far enough from the fire or heat source to prevent damage to the motor. Preferably, the hook and motor is contained within a single frame which has two hooks at the top thereof so that the frame may be suspended from a horizontal pipe.

The portable cooking apparatus of the present invention has the advantage that meat or other objects to be cooked can be hung vertically and rotated continuously about a vertical axis while cooking. Rotation of the meat is constant and at a uniform rate, and thus the meat is evenly cooked.

Furthermore, the cooking apparatus of the present invention is relative low in weight and can be easily moved from one location to another. Also, the cooking apparatus of the invention permits the motor that drives the vertical meat hanging hook to be placed sufficiently far away from the fire to prevent any damage to the motor or electrical cords leading thereto.

BRIEF DESCRIPTION OF THE DRAWINGS

The invention will be more fully understood by reference to the drawings in which.

DESCRIPTION OF THE PREFERRED EMBODIMENTS

Figure 1:
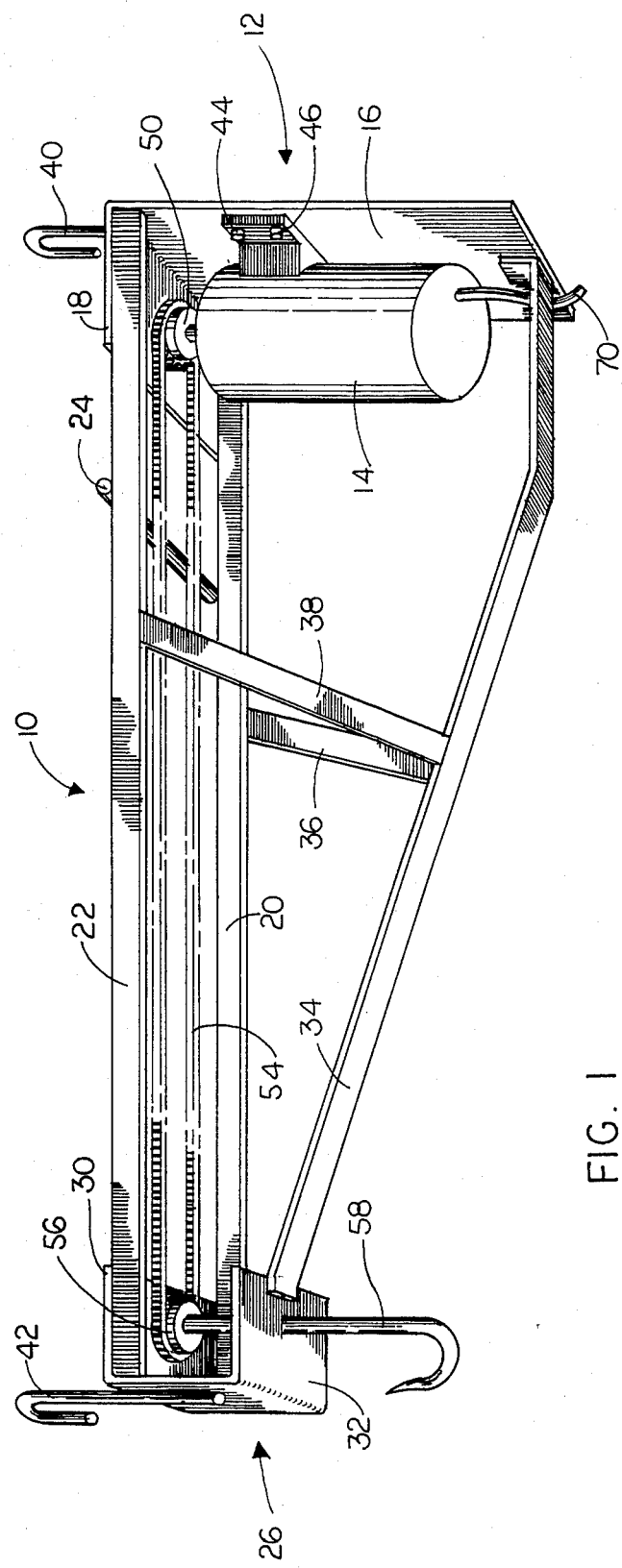
FIG. 1 is a perspective view of the apparatus of the invention.
Figure 2:
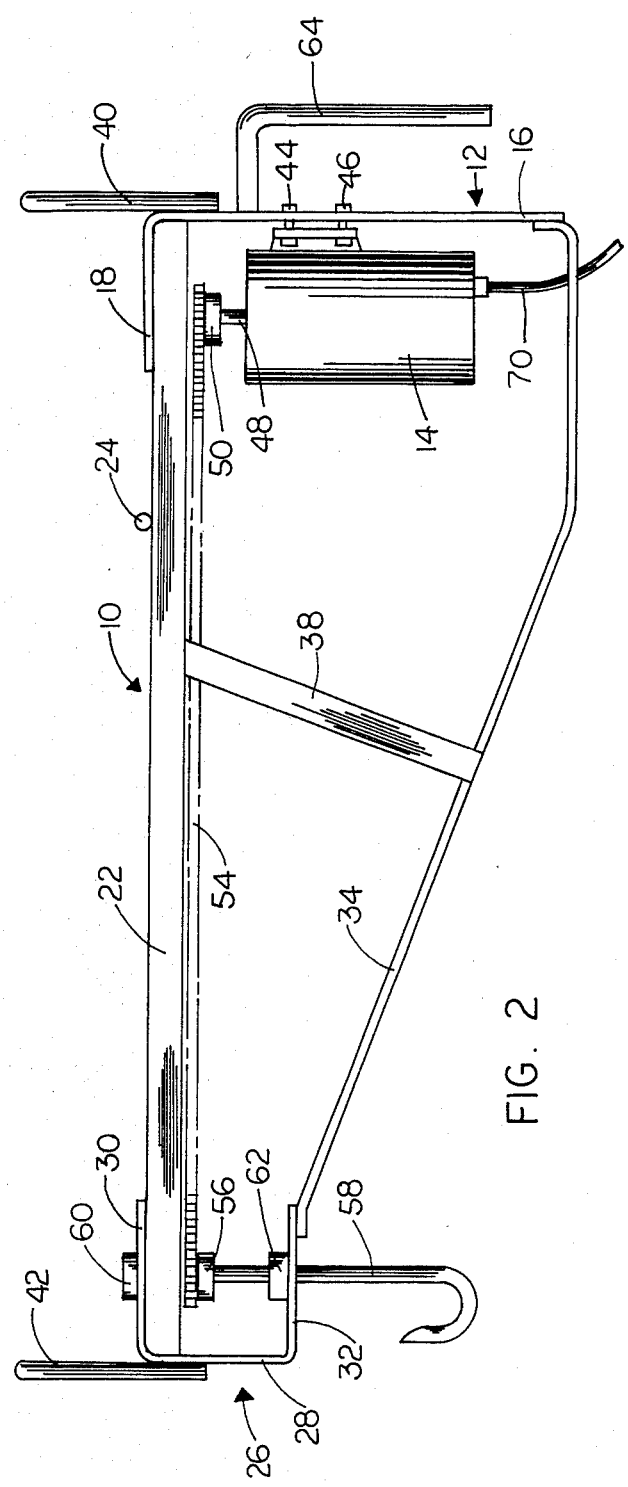
FIG. 2 is a side, plan view of the apparatus of the invention.
Figure 3:
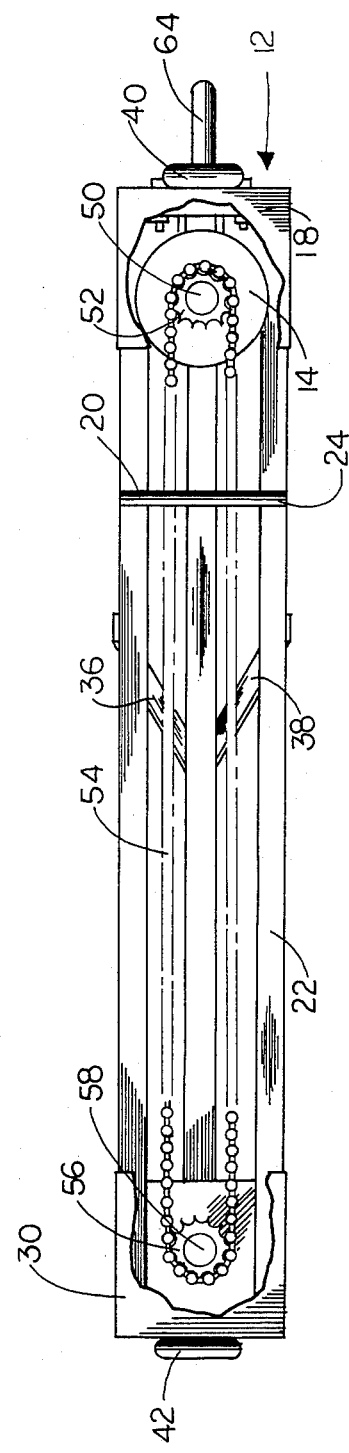
FIG. 3 is a top, plan view, partially cut away, of the apparatus of the invention.

Referring now to the drawings, the apparatus of the invention can be seen to include a frame generally indicated by the numeral 10. The frame includes an first end plate 12 to which a electric motor 14 is connected. First end plate 12 has a vertical portion 16 which is generally rectangular in shape and a horizontal portion 18 which is generally rectangular in shape. As shown in the drawings first end plate 12 is formed from one integral piece of material. However, if desired, plate 18 can be joined to plate 16 by welding or the like.

Connected to plate 12 are two horizontal beams 20 and 22. Beams 20 and 22 may be made from angle iron as shown in the drawings or they may be made from round pipe, flat bar or the like. Beams 20 and 22 are preferably welded to end plate 12 although they may be connected by any other means well known in the art. Preferably, a brace 24 is rigidly connected to beams 20 and 22 by welding or the like to prevent the beams from spreading apart.

A second end plate generally indicated by the number 26 is connected to the end of beams 20 and 22 opposite the end of beams 20 and 22 to which plate 12 is attached. Second end plate 26 is generally "U" shaped. Second end plate 26 includes a vertical portion 28 connected to a top horizontal portion 30 and a bottom horizontal portion 32. End plate 26 as shown in the drawings is formed from one continuous piece of material, but if desired, upper horizontal plate 30 and lower plate 32 could be welded to vertical plate 28 or connected to vertical plate 28 by any suitable means.

Connected to the end of bottom horizontal plate 32 is lower brace 34. Lower brace 34 is also connected to the bottom of vertical plate 16. Lower brace 34 prevents the ends of horizontal plate 32 and vertical plate 16 from moving in a horizontal direction.

Connected to lower brace 34 are upper braces 36 and 38. Lower braces 36 and 38 are connected at their upper ends to beams 20 and 22 respectively. Braces 36 and 38 prevent brace 34 from moving upwardly in the direction of brace 36 and 38.

Connected to first end plate 12 and second end plate 26 are two hooks 40 and 42 respectively. Hooks 40 and 42 are utilized to hang the apparatus of the invention from a horizontal member such as a pipe or a pole.

Motor 14 is connected to first end plate 12 by bolts 44 and 46. If desired, motor 14 could be connected to end plate 12 by any other means well known in the art such as welding, clamping or the like. Motor 14 has a shaft 48 extending vertically upwardly therefrom to which is connected a sprocket 50. Sprocket 50 has a series of teeth 52 thereon which engage chain 54. Chain 54 in turn engages sprocket 56 which is mounted on meat hook 58.

Meat hook 58 extends through bottom plate 32 and upper plate 30 and rotates in bearings 60 and 62. Bearings 60 and 62 are any conventional bearings such as ball bearings or the like.

If desired, a handle 64 can be attached to end plate 12 to aid in carrying the apparatus of the invention from one location to another. Furthermore, a handle similar to handle 64 could be connected to second end plate 26.

Motor 14 preferably has a reduction gear therein selected to cause shaft 48 to turn at the desired speed. A electrically conductive cord 70 extends therefrom for connection to an electrical outlet.

To utilize the portable, vertical meat rotisserie of the present invention, the rotisserie is transported to the site at which the cooking is to be accomplished. A horizontal pole is extended over the location of the fire and the rotisserie is hung from the horizontal pole by means of hooks 40 and 42. Meat such as a whole pig is then placed on hook 58, and motor 14 is activated by connecting the electric cord 70 motor 14 to an energy supply such as a 110 volt electrical outlet. The fire is then ignited and the meat is allowed to rotate over the fire until cooking is completed.

The rotisserie apparatus of the invention is preferably constructed from a metal such as aluminum or steel. All of the members are preferably welded together, although they may be bolted, riveted or connected by any other means well known in the art. Chain 54 is preferably selected of a length sufficient to place motor 14 at a position far enough removed from the fire beneath hook 58 to prevent motor 14 from incurring any damage as a result of heat radiated from the fire beneath the hook 58.

Although the preferred embodiments of the present invention have been disclosed and described in detail above, it should be understood that the invention is in no sense limited thereby, and its scope is to be determined by that of the following claims.

What is claimed is:

1. A portable cooking apparatus for suspending and rotating food in close proximity to a heat source, comprising:
    a. portable frame means adapted to be suspended from an elongated horizontal support member, said portable frame means having a first end plate and a second end plate, said first end plate and said second end plate being parallel;
    b. hook means for suspending food to be cooked, said hook means being rotatably connected to said frame means, said hook means being rotatable about a vertical axis;
    c. electric motor means rigidly connected to said frame means for rotating said hook means, said motor means being located on said frame means at a distance from said hook means and said heat source sufficient to prevent damage to said electric motor means from said heat source, said electric motor means being connected to said first end plate, and
    d. drive means for connecting said electric motor means to said hook means for causing said hook means to rotate.

2. The apparatus of claim 1 wherein said first end plate is rectangular in shape.

3. The apparatus of claim 2 wherein said rectangular first end plate has two long sides and two short sides, the long sides being vertical when said apparatus is in use.

4. The apparatus of claim 1 wherein said first end plate and said second end plate are vertical when said apparatus is in use.

5. The apparatus of claim 4 wherein each of said two end plates have an upper end and a lower end, the upper ends being connected by upper horizontal brace means and the lower ends being connected by lower brace means.

6. The apparatus of claim 1 wherein said frame means has support hook means rigidly connected thereto for suspending said frame means from said elongated horizontal support member.

7. The apparatus of claim 6 wherein said drive means comprises a chain means.

8. The apparatus of claim 7 wherein said hook means for suspending food has a first sprocket means rigidly connected thereto for receipt of said chain means.

9. The apparatus of claim 8 wherein said electric motor means has a drive shaft extending therefrom, said drive shaft having a second sprocket means rigidly connected thereto for receipt of said chain.

10. The apparatus of claim 9 wherein said hook means for suspending food to be cooked has an elongated shank means rotatably received in bearings connected to said frame means, said shank means having said first sprocket means rigidly connected thereto.

11. A portable cooking apparatus for suspending and rotating food in close proximity to a heat source, comprising:
   a. a portable frame means adapted to be suspended from an elongated horizontal support member, said frame means having first and second end plates, said first and second end plates being parallel and each plate having an upper and a lower end, said upper ends of said first and second plates being rigidly connected by upper horizontal brace means, said lower ends of said first and second plates being connected by lower brace means,
   b. hook means for suspending food to be cooked, said hook means having an elongated shank portion and a curved portion, said shank portion being rotatably received in said frame means whereby said shank portion is rotatable about a vertical axis when said cooking apparatus is being used to cook food suspended from said hook means, said shank portion being connected to said frame means between said first and said second end plates adjacent to said second end plate, said shank portion having first sprocket means rigidly connected thereto,
   c. electric motor means rigidly connectable to said first end plate means between said first end plate and said second end plate for rotating said hook means for suspending food to be cooked, said electric motor means being located at a distance from said hook means for suspending food to be cooked sufficient to prevent damage to said electric motor means by said heat source, said electric motor means having a drive shaft extending therefrom aligned for vertical rotation when said cooking apparatus is being used to cook food, said drive shaft having a second sprocket rigidly connected thereto, said first sprocket being aligned in the same plane with said second sprocket, and
   d. drive chain means connectable to said first sprocket and said second sprocket for rotating said first sprocket as said second sprocket rotates on the drive shaft of said electric motor.

12. The apparatus of claim 11 wherein said shank portion is rotatably received in bearing means connected to said frame means.

13. The apparatus of claim 12 wherein handle means is connected to said frame means for transporting said apparatus.

14. The apparatus of claim 13 wherein rigid bracing means are connected to said upper horizontal brace means and said lower horizontal brace means.

15. The apparatus of claim 11 wherein said second end plate, when said apparatus is positioned for cooking, has a vertical portion which is parallel to said first end plate, an upper horizontal plate rigidly connected to the top of said vertical portion, and a horizontal lower plate rigidly connected to the bottom of said vertical portion, said upper horizontal plate and said lower horizontal plate having a hole therein for rotatable receipt of said elongated shank portion of said hook means.

* * * * *